INVENTOR.
William J. Miller
BY
Fred C. Matheny
ATTORNEY

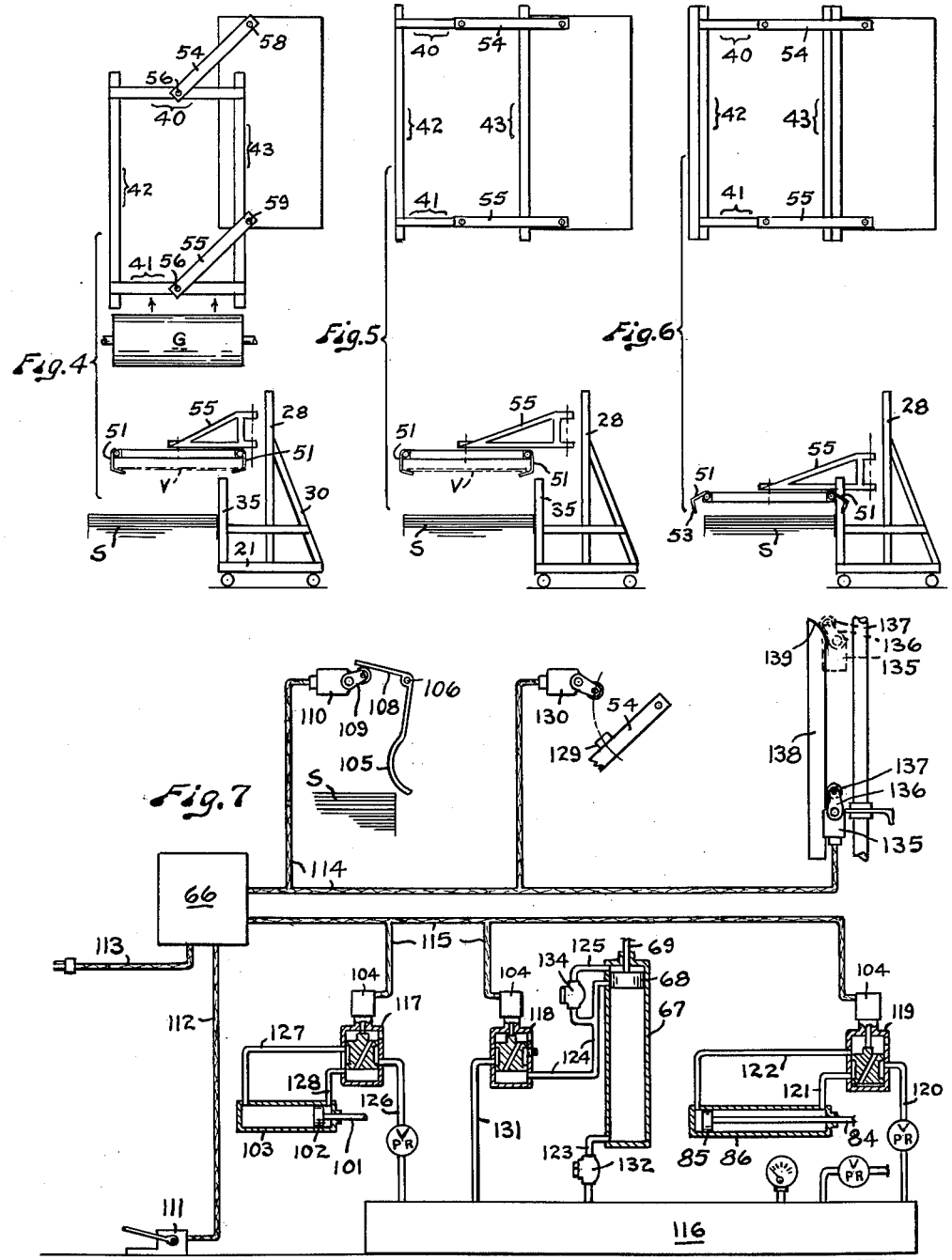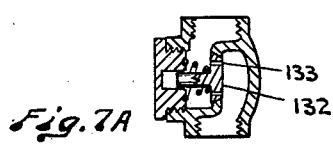

March 27, 1962 W. J. MILLER 3,027,019
PLYWOOD LAY-UP MACHINE
Filed May 25, 1955 7 Sheets-Sheet 5

INVENTOR.
*William J. Miller*
BY
*Fred C. Matheny*
ATTORNEY

March 27, 1962  W. J. MILLER  3,027,019
PLYWOOD LAY-UP MACHINE
Filed May 25, 1955  7 Sheets-Sheet 7

INVENTOR.
William J. Miller
BY
Fred C. Matheny
ATTORNEY

_United States Patent Office_

3,027,019
Patented Mar. 27, 1962

---

3,027,019
PLYWOOD LAY-UP MACHINE
William J. Miller, 600 W. Spokane St., Seattle, Wash.
Filed May 25, 1955, Ser. No. 510,954
2 Claims. (Cl. 214—6)

This invention relates to a plywood lay-up machine and an object of this invention is to provide a machine which will facilitate the handling of large sheets of wood veneer having fresh or wet glue thereon in the process of laying up plywood in a plywood manufacturing plant.

In the manufacture of plywood the less desirable pieces of veneer, many of which are relatively narrow, are usually used as core stock. It is common practice to manually take these pieces of core stock as they come from between pairs of glue applicator rolls, lay them one at a time on face stock or like veneer sheets with which they are assembled, push them together edge to edge as well as possible and place other sheets of veneer on them preparatory to curing. This commonly used method necessitates the handling of each individual piece of core stock in the laying up process and it often results in the pieces of core stock not being pushed entirely together or being shoved apart after they have been laid so that core cavities are left in the plywood through which moisture may enter and which are unsightly and weaken the plywood and may leave bad edges and cause waste when the plywood is sawed in using it.

Objects of this invention are to overcome the objections above pointed out and to improve the quality of plywood by making it both possible and practical to edge glue the core stock before it is used in the plywood and to handle this core stock, in the lay-up process, in the form of sheets equal to the size of the sheets of plywood being made. The edge gluing of the core stock, which can be done economically in an edge gluing machine, insures against core cavities and obviates the handling of each piece of core stock in the lay-up process. The elimination of core cavities improves the quality and strength and appearance and durability of the plywood. Making it possible to handle the core stock for each piece of plywood in a single sheet saves time and labor. It will be understood that sheets of veneer core stock which have been edge glued and then clipped to a size equal to the size of the plywood panels ordinarily made are so large and flexible that it is not feasible to handle them manually in the lay-up process and with the wet glue on them.

Another object of this invention is to provide a plywood lay-up machine for receiving, from glue applicator rolls, and transferring to a plywood lay-up stack or pile, large sheets of edge glued core stock or veneer coated on both sides with fresh glue, said machine comprising a main frame supporting a veneer carriage for vertical and horizontal movement between a loading position in registration with the glue applicator rolls and a veneer dropping position over a plywood lay-up stack, said carriage having at its two sides two parallel spaced apart movably mounted shelf like veneer supporting members, which in the loading position receive the edge portions of a veneer sheet entering from the end of the carriage and in the veneer dropping position are moved apart in releasing the veneer sheet.

Another object of this invention is to provide a plywood lay-up machine of this type in which a swingingly movable veneer carriage is in a position in which it is out of the way of the operators who are laying up the veneer while it is being loaded with a core sheet coming from glue applicator rolls.

Other objects of this invention will be apparent from the following description taken in connection with the accompanying drawings.

In the drawings FIGURE 1 is a top plan view of a veneer lay-up machine constructed in accordance with this invention, the carriage being shown in a veneer dropping position.

FIG. 4 is a diagram showing in one view a plan and an end elevation of the machine with the carriage in the loading position.

FIG. 5 is a view similar to FIG. 4 showing the carriage in an elevated position over a plywood lay-up stack preparatory to lowering and dropping a sheet of core stock onto the stack.

FIG. 6 is a view similar to FIGS. 4 and 5 except that it shows the carriage lowered above the plywood lay-up stack and the veneer holding members moved apart in dropping a sheet of veneer.

FIG. 7 is a combined electrical and fluid pressure control diagram.

FIG. 7A is a detached view of a check valve with bleed holes.

Like reference numerals indicate like parts throughout the several views.

Figure 1:
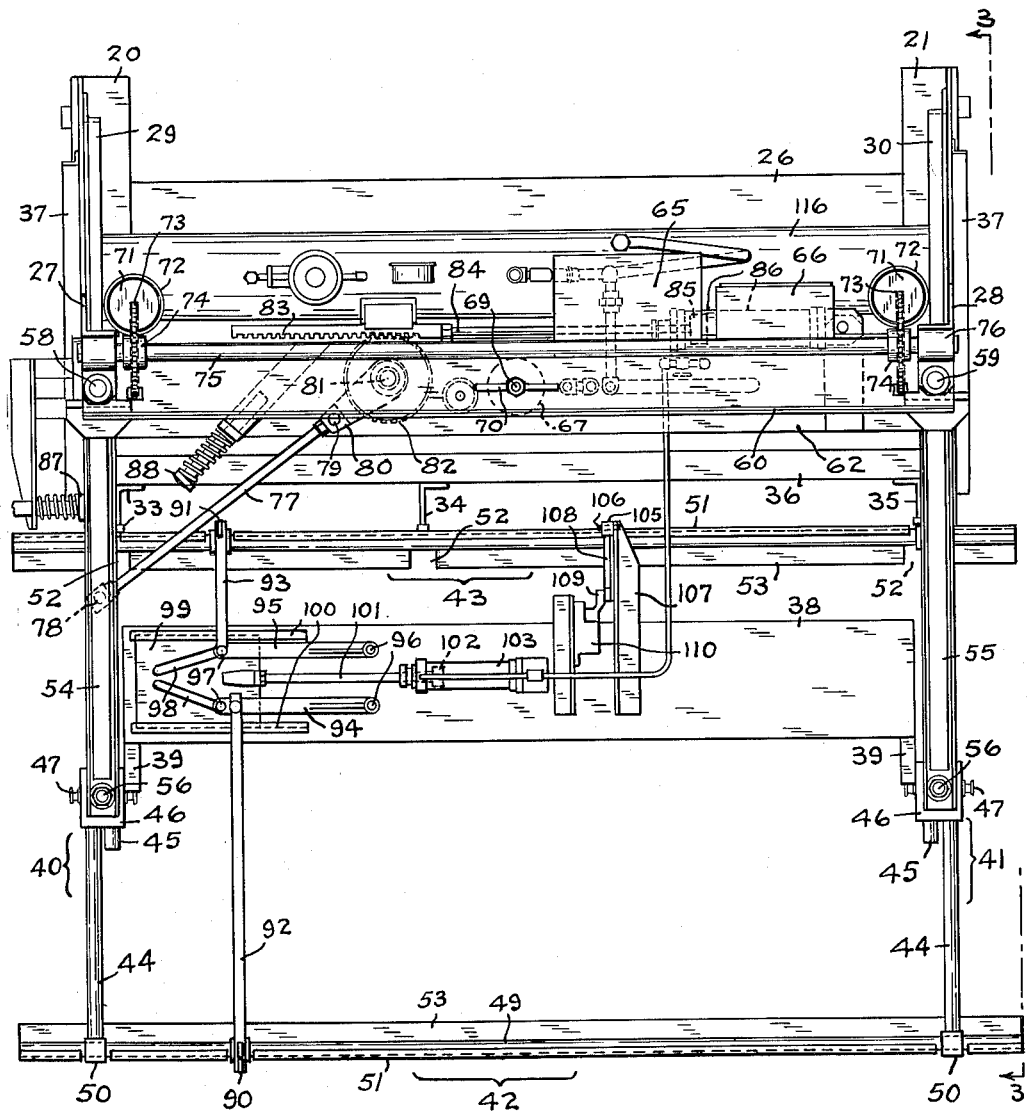
Figure 2:
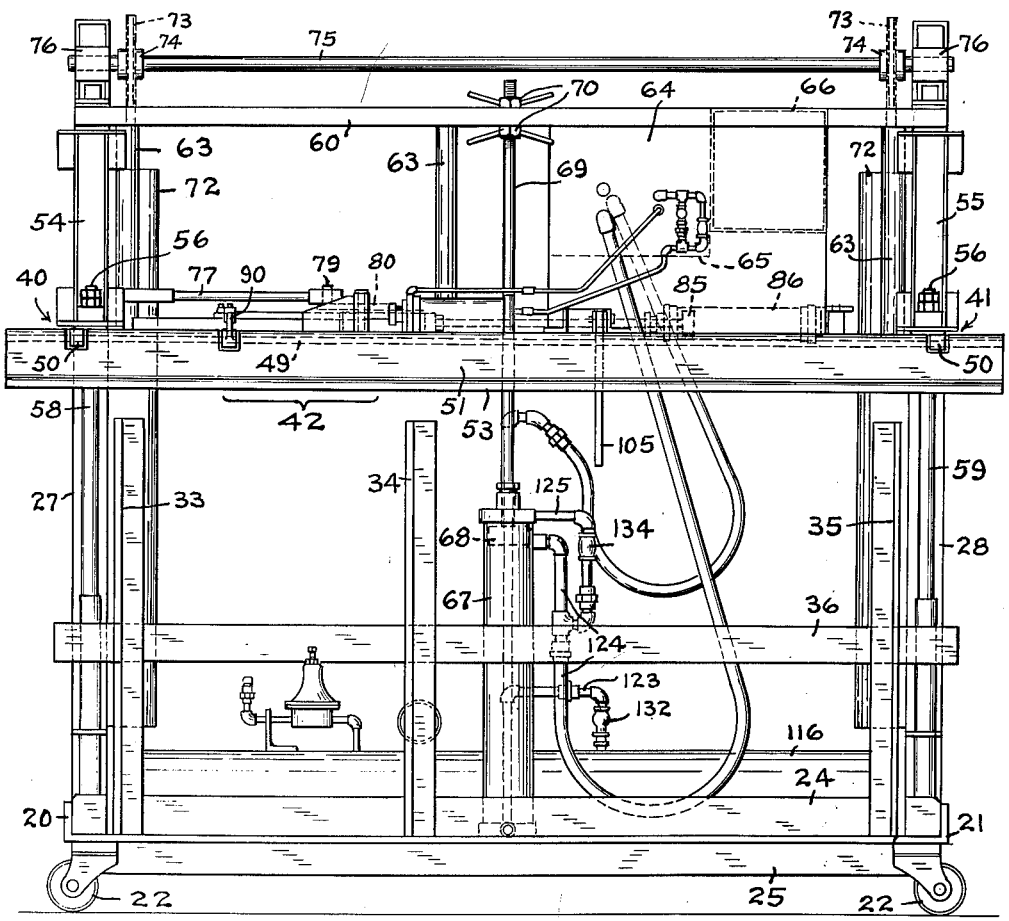
FIG. 2 is a front elevation of the same.
Figure 3:
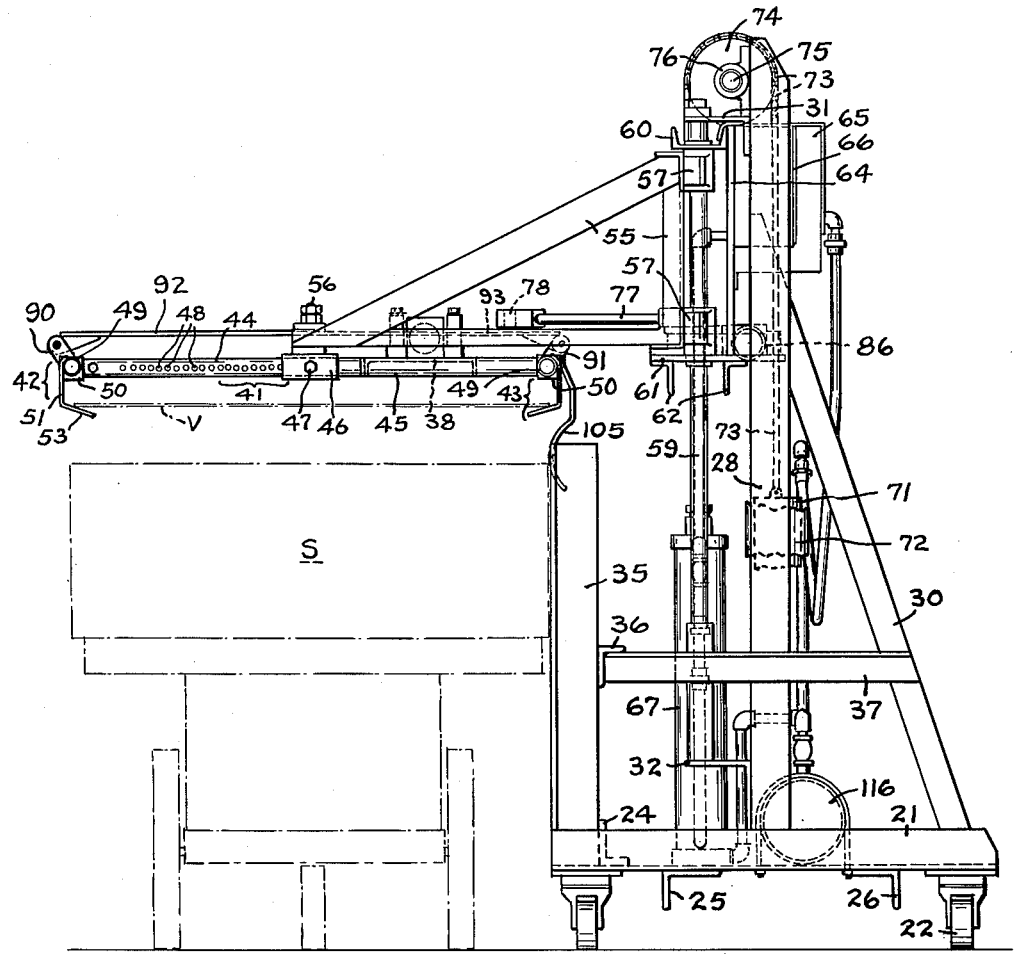
FIG. 3 is an end view looking in the direction of broken line 3—3 of FIG. 1.

Referring first to FIGS. 1, 2 and 3, a main frame built up chiefly of angle and channel bars is shown. This frame can be widely varied but as herein shown it comprises two spaced apart end bars 20 and 21 mounted on casters 22 and rigidly connected with each other, preferably by three longitudinally extending base-frame bars 24, 25 and 26. Two main upright frame bars 27 and 28 are secured to the respective end bars 20 and 21 approximately medially of the length of said end bars 20 and 21. Two diagonal truss bars 29 and 30 are secured between the upper portions of the respective upright frame bars 27 and 28 and the rear end portions of the cross bars 20 and 21, that is the portions shown at the right in FIG. 3, for purposes of strength and rigidity.

At least two and preferably three upright longitudinally aligned veneer guide or positioning bars 33, 34 and 35 are provided at one side of the previously described frame, namely the side shown at the left in FIG. 3. The lower ends of the upright guide bars 33, 34 and 35 are secured to the longitudinal frame bar 24 in the base of the frame and said upright guide bars are further supported by another longitudinal frame bar 36 which is spaced above the frame bar 24 and braced by cross frame bars 37. The edges of the veneer sheets are placed against the bars 33, 34 and 35 in laying up the plywood.

The previously described frame is herein referred to as a main frame and it supports a veneer carriage which receives the freshly glue-coated sheets of veneer or core stock and moves them into a position directly over a plywood lay-up stack, indicated by dot and dash lines S, FIG. 3, and drops them onto said stack. This veneer carriage is of approximately rectangular shape and has two transverse carriage members, indicated generally by 40 and 41 and two longitudinally extending veneer carrying carriage members indicated generally by 42 and 43. In the construction herein shown the two transverse members 40 and 41 are positioned near the respective ends of the longitudinal members 42 and 43 but obviously their positions may be varied. The transverse members 40 and 41 pivotally and adjustably support the longitudinally extending members 42 and 43 in spaced apart parallel relation as hereinafter explained.

Each transverse carriage member comprises preferably two relatively offset bars 44 and 45 having overlapping end portions which are slidably and telescopically received in suitable parallel holes in a guide and pivot block 46. A removable pin or bolt 47 extends crosswise through the block 46 and through any selected one of a set of spaced apart holes 48 in the outermost bar 44. As the two outermost bars carry the outermost or front veneer carrying member 42 this makes it possible to adjust said outermost or front veneer carrying member 42 toward and away from the innermost or rear veneer carrying member 43 to take care of veneer of different widths.

Preferably a bracket 39 is welded or otherwise rigidly secured to the inner side of each pivot block 46 and the two transverse carriage members 40 and 41 at opposite ends of the carriage are connected with each other by a plate 38 of inverted channel shaped cross section positioned with its flat side uppermost. The plate 38 serves as a mounting plate for parts hereinafter described and also as part of the frame of the carriage.

Each longitudinally extending veneer carrying members 42 and 43 comprises a preferably tubular bar or rod 49 which is supported for oscillation in bearing blocks 50. The bearing blocks 50 are rigidly secured to the outer end portions of the bars 44 and 45 of which the transverse carriage members 40 and 41 are formed. Each tubular bar 49 has a long grip or veneer holding member 51 of approximately L shaped cross section secured thereto. Preferably the grip members 51 are shaped and arranged so that a veneer or core sheet V, shown by dot and dash lines in FIG. 3, can be supported in a horizontal position on veneer holding flanges 53 of said grip members 51 with only the longitudinally extending corner portions of the edges of the sheet touching the flanges 53. This minimizes rubbing the glue off to the veneer and minimizes glue deposits on the veneer supporting flanges 53 of the grip members 51. The drawings show these inwardly extending flanges 53 as inclined downwardly at an angle of about fifteen degrees relative to the horizontal from their outer toward their inner edges when they are in a veneer holding position. Oscillation of the tubular bars 49 in the bearing blocks 50 by means hereinafter described will move the veneer holding members 51, 53 between a veneer holding position, as shown in FIG. 3, and a veneer dropping position as shown in diagrammatic FIG. 6. The rear veneer holding member 51, 53, that is the one shown uppermost in FIG. 1 and at the right in FIG. 3, has notches 52 at the location of the upright guide bars 33, 34 and 35 to clear these bars when the grip member is in the open position.

The veneer carriage just previously described is supported for swinging and vertical movement, as illustrated diagrammatically in FIGS. 4, 5 and 6 inclusive by preferably two similar triangularly shaped brackets 54 and 55. The forward end portion of each bracket 54 and 55 is connected by a vertical pivot 56 with one of the pivot blocks 46. The rear ends of the brackets 54 and 55, that is the ends of said brackets remote from the pivot blocks 46, are provided with bearing members 57, FIG. 3, by which said brackets are respectively mounted for horizontal swinging movement and for vertical sliding movement on two upright slide shafts or rods 58 and 59. The rods 58 and 59 are positioned near opposite ends of the machine and rigidly supported from the respective upright frame bars 27 and 28 by upper angle brackets 31 and lower angle brackets 32. The bearing members 57 are disposed between an upper horizontal channel member 60 and lower bottom plates 61 of a vertically movable carriage frame. The bottom plates 61 are supported on suitable frame bars 62 which extend horizontally from end to end of the machine parallel to the channel member 60. Vertical frame parts 63 rigidly secure the channel member 60 and frame bars 62 together. From the foregoing description it will be apparent that the swinging veneer or core sheet carriage and the vertically movable carriage supporting frame formed by parts 60 to 63 inclusive are both supported from the upright slide shafts 58 and 59 and that they will move up and down together. Preferably an upright panel 64 is secured to the vertically movable carriage supporting frame formed by parts 60, 61, 62 and 63 and two cabinets 65 and 66 which contain respectively the air control devices and the electrical control devices are secured to this frame. The means herein illustrated for bringing about and controlling the vertical movement of these parts comprises a pneumatic lift cylinder 67 having a piston 68 with attached piston rod 69 which is adjustably connected by hand operated nuts 70 with the channel bar 60. Two counterweights 71 disposed in housings 72 are connected with the channel bar 60 by link belts 73 which pass over guide sprockets 74. These counterweights 71 counterbalance at least a portion of the weight of the carriage mechanism and facilitate vertical movement of this carriage mechanism as hereinafter explained. Only a fragment of one counterweight 71 and housing 72 are shown in FIG. 3. The two guide sprockets 74 are mounted on and keyed or otherwise fixedly secured to a common equalizer shaft 75. The shaft 75 is rotatively supported by bearings 76 from the upper end portions of the upright frame posts 27 and 28 and thus equal vertical movement of the two end portions of the veneer carriage and the frame formed by parts 60 to 63 is insured.

The means for swingingly moving the veneer carriage between a veneer receiving position in front of a pair of glue applicator rolls G, in which it is shown in diagrammatic FIG. 4, and a veneer dropping or discharging position in which it is shown in FIGS. 1, 2, 3 and 5 is as follows: A diagonal rod 77, FIGS. 1 and 2, has one end connected by a pivot 78 with the lower bar of the triangular bracket member 54 and has its other end connected by a pivot 79 with a crank arm 80. The crank arm 80 is secured to a vertical shaft 81. The vertical shaft 81 has a gear wheel 82 secured thereto and the gearwheel 82 meshes with a gear rack 83. The rack 83 is secured to a piston rod 84 which is connected with a piston 85 in a hydraulic cylinder 86. The air control for cylinder 86 is hereinafter described. When the crank arm 80 is moved in a clockwise direction from the position in which it is shown in FIG. 1, the veneer carriage will be moved into the loading position, FIG. 4, and the return swing of the crank arm 80 will return the carriage to the veneer dropping position. Two resilient bumper members 87 and 88 are positioned to limit the swinging movement of the bracket arm 54 in both directions.

The means for simultaneously pivotally moving the two veneer holding members 51, 53, which receive and hold and drop the veneer, comprises a short lever arm 90, FIG. 1, rigidly attached to the shaft 49 of the front carriage member 42, another short lever arm 91 rigidly attached to the shaft 49 of the rear carriage member 43 and two transverse links 92 and 93 having their outer ends pivotally connected with the respective lever arms 90 and 91 and their inner ends pivotally connected respectively with two spaced apart guide bars 94 and 95. Link 92 can be adjustably connected with bar 94 or it can be replaced by a link of different length in case the distance between the two veneer carrying members 42 and 43 is adjusted. The ends of the guide bars 94 and 95 shown at the right in FIG. 1 are supported on pivots 96 which are rigid with the carriage frame plate 38. The other ends of the guide bars 94 and 95 have pins or rollers 97 or similar devices which operate in inclined slots 98 in a grip operating plate 99 which is slidably mounted for reciprocating movement lengthwise of the carriage frame plate 38 by longitudinally extending guide members 100. The grip operating plate 99 is connected by a piston rod 101 with a suitable piston 102 in a grip operating cylinder 103, the operation of which is more fully described in connection with the diagram FIG. 7. The pivotal opening movement of the veneer holding grip members 51, 53 and the raising of the veneer carriage are both controlled by a trip arm 105 which is carried by the veneer carriage and extends downwardly from said carriage and has a curved lower end portion which contacts the side of the stack or lay-up pile S of veneer as the carriage is lowered. The trip arm 105, see also FIG. 7, is mounted by a pivot 106 on a bar 107 which is rigid with and extends transversely from the carriage frame plate 38. A bell crank extension 108 on the upper end part of trip arm 105 is positioned to engage with a switch arm 109 and operate a switch 110. The switch 110 controls the supply of air under pressure to the two pneumatic cylinders 86 and 67 as hereinafter more fully explained.

The operation of this device is illustrated in diagrammatic FIGS. 4, 5, 6 and 7. Assuming the carriage to be in the loading position, FIG. 4, the grip members 51, 53 will be closed and properly positioned and aligned in front of the glue rolls G so that veneer or core stock emerging from the glue rolls G will be deposited on the flanges 53 of the grip members 51. In this loading position, the veneer carriage will be held in its maximum raised position by the lift cylinder 67 and it will remain in the loading position until the head operator actuates a foot switch 111, FIG. 7, to start the operating cycle.

In the schematic control diagram, FIG. 7, the electric control circuits are conventional and the individual conductors are not shown but numerals 112, 113, 114 and 115 indicate cables or conduits, herein referred to as lines, which carry these conductors and which connect with the cabinet 66. Said cabinet 66 houses suitable relays and electrical devices of well known conventional form used in completing the several circuits. The conductor means represented by lead 113 connects control devices in the cabinet 66 with a suitable source of electrical energy. The conductor means represented by the lead 112 connects the foot switch 111 with control devices in the cabinet 66. The conductor means represented by leads 114 provides connection between the several carriage operated switches and the devices in the cabinet 66. The conductor means represented by the leads 115 provide connection between the solenoids 104 of three electrically operated valves 117, 118 and 119 and devices within the cabinet 66. 116 is an air pressure supply tank in which a supply of compressed air at predetermined pressure is maintained. The valves 117, 118 and 119 respectively control the admission of compressed air from the tank 116 to the grip operating cylinder 103 and the lift cylinder 67 and the swing cylinder 86 and further control the exhaust of air from these cylinders.

When the veneer carriage is in the loading position, as shown in FIG. 4, air pressure from the tank 116 will be conducted through conduit 120, valve 119 and conduit 121 to the end of the swing cylinder 86 through which the piston rod 84 operates, this being referred to as the top end, and will hold said veneer carriage in this loading position. At the same time the other or bottom end of the swing cylinder 86 will be open to exhaust through conduit 122 and valve 119. Also at this same time air pressure entering the bottom of the lift cylinder 67 through conduit 123 will be holding the veneer carriage in the raised position and the upper end of the lift cylinder will be open to exhaust through conduits 124 and 125 and valve 118. Also at this same time pressure entering the bottom end of the grip operating cylinder 103 by way of conduit 126, valve 117 and conduit 127 will be holding the grip members 51 closed and the upper end of the grip operating cylinder 103 will be open to exhaust through conduit 128 and valve 117.

While the veneer carriage is thus in the loading position the operators, usually two in number working in front of the machine, will be properly positioning one or more sheets of veneer on a glue covered core sheet just previously dropped on the lay-up stack S by the veneer carriage and properly adjusting the sheets on this stack S. When ready for another core sheet one of the operators will start the cycle of operation by actuating the foot switch 111. This will cause the valve 119 to be moved to a suitable position to reverse the just described air inlet and exhaust connections of the swing cylinder 86 so that said cylinder 86 and parts cooperating therewith will swing the veneer carriage from the loading position shown in FIG. 4 to a lowering position directly above the stack S, as shown in FIG. 5, where the carriage will be properly positioned in one direction by the bumper 87 and will be held against swinging movement away from the bumper 87 by air pressure in the cylinder 86. Just before the veneer carriage reaches the FIG. 5, lowering position a portion of said carriage, such as a trip member 129 on the bracket 54 will operate a switch 130 and this will position the valve 118 so that air pressure is admitted by way of conduit 131, valve 118 and conduits 124 and 125 above the piston 68 in the lift cylinder 67. The admission of air pressure above the piston 68 will substantially balance the air pressure on the two sides of this piston 68 and the weight of the veneer carriage and parts connected therewith, including the panel carried thereby, will lower the veneer carriage into a position as shown in FIG. 6 and at the same time will move the piston 68 downwardly in the cylinder 67. The counterweights 71 counterbalance some but not all of the weight of the carriage and its parts leaving a weight differential in favor of the carriage and its parts sufficient to move the piston 68 downwardly in the cylinder and force the compressed air below this piston 68 back into the air tank 116 when air pressure on the two sides of said piston 68 is substantially equalized. Preferably a check valve 132 with bleed holes 133, see also FIG. 7A, is provided in the conduit 123 between the air tank 116 and the bottom of the lift cylinder 67. Also a similar check valve 134 with bleed holes is provided in the conduit 125. The check valve 132 adaptes the lift cylinder to lower the veneer carriage at a rate of speed predetermined chiefly by the area of the bleed holes 133 and the check valve 134 in conduit 125 provides a shock absorber or cushion on the up stroke of the piston 68. The conduit 125 is a by-pass conduit having one end connected with the conduit 124 and the other end connected with the uppermost end of the lift cylinder above the point of connection of said conduit 124 with said lift cylinder. Air trapped in the upper end of the cylinder 67 after the piston 68 closes the port of conduit 124 on the up stroke of said piston will have to escape slowly through the bleed holes in check valve 134 and this will absorb the shock and prevent abrupt stoppage of upward movement of the carriage.

As the veneer carriage moves downwardly in lowering a sheet V of core stock the trip arm 105 will contact the lay-up stack S and operate the switch 110. This will cause the valve 117 to be moved so as to reverse the connections to the grip operating cylinder and open the grips, as shown in FIG. 6, and drop the core sheet carried thereby in its proper position on the lay-up stack. Also this operation of the switch 110 will cause the valve 118 to shut off the supply of air under pressure to the upper end of the lift cylinder 67 and open the same to exhaust and to admit pressure to the lower end of said cylinder 67, whereupon air pressure in the lower end of the lift cylinder will begin to lift the carriage. At about the time the carriage reaches the uppermost limit of its movement a spring actuated switch 135 which is carried by said carriage and has an arm 136 with a roller 137 which rides on a rigid frame shoe 138 will move onto a curved end portion 139 on said shoe and be operated. This operation of switch 135 will operate electric means which will cause the valve 117 to reverse the air pressure and exhaust connections to the grip operating cylinder 103 and the grips 51 will be moved to closed position as shown in FIG. 3. Also the operation of switch 135 will operate electric means which will cause the valve 119 to reverse the air pressure and exhaust connections to the swing cylinder 86 and the veneer carriage will be swung back to the loading position shown in FIG. 4, where it will remain until the foot switch 111 is again operated.

The cycle just described is fully automatic and will be completed without further attention from the operators after the switch 111 has been actuated. The carriage always starts from the loading position where it is out of the way of the operators and where it has received a core sheet with fresh glue on it. The carriage first swingingly moves to a position directly above the lay-up stack S, it then moves downwardly until stopped by the switch arm 105 a short distance above the top of the lay-up stack, the veneer holding members 51 then open and drop the core sheet, the carriage then moves upwardly and at the same time the veneer holding members 51 move to a closed position, the carriage then swings back to the loading position and stops. The glue rolls G load or push the freshly glued core sheet endwise into the carriage.

Figure 8:
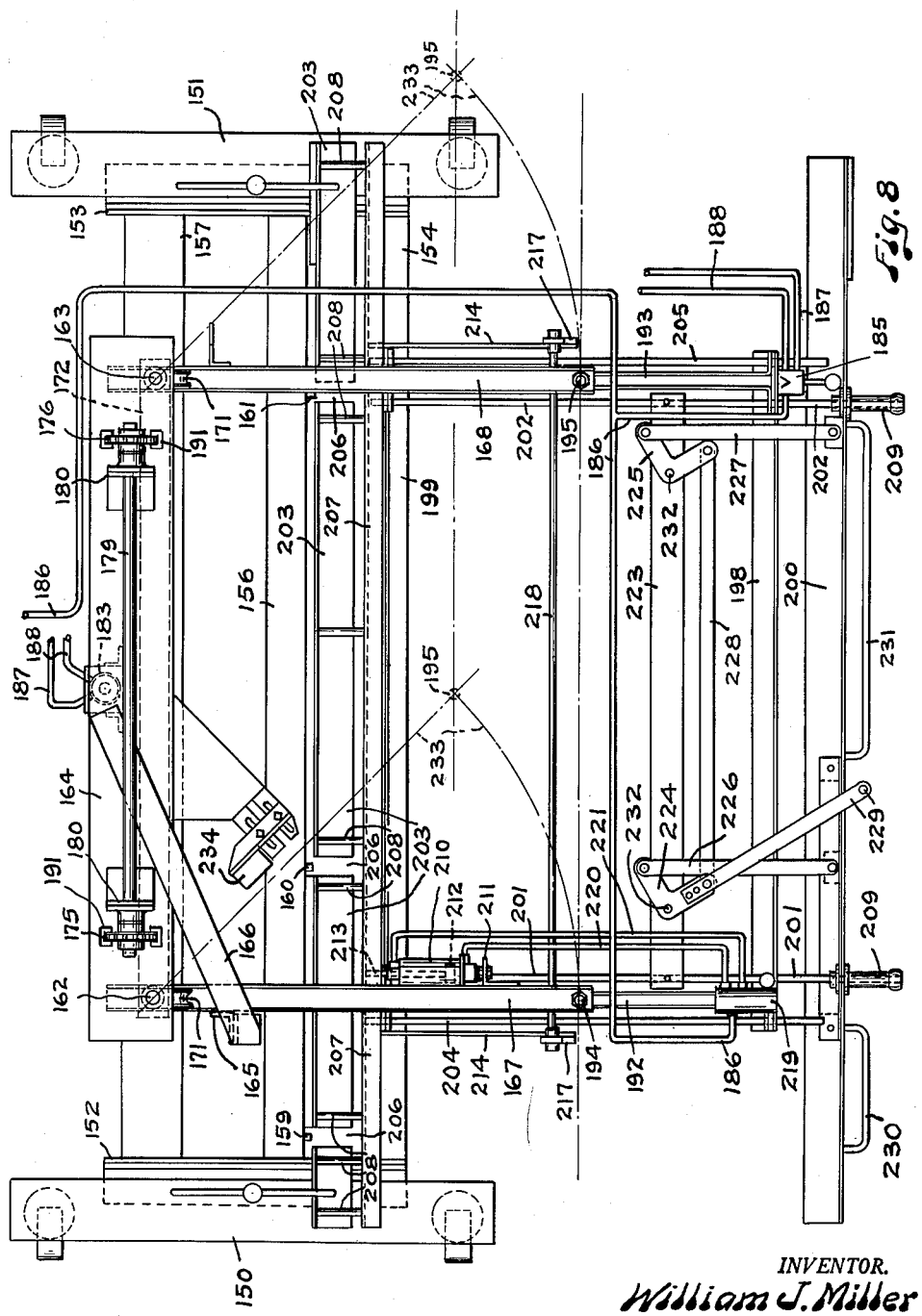
FIG. 8 is a top plan view of a plywood lay-up machine of modified form.
Figure 9:
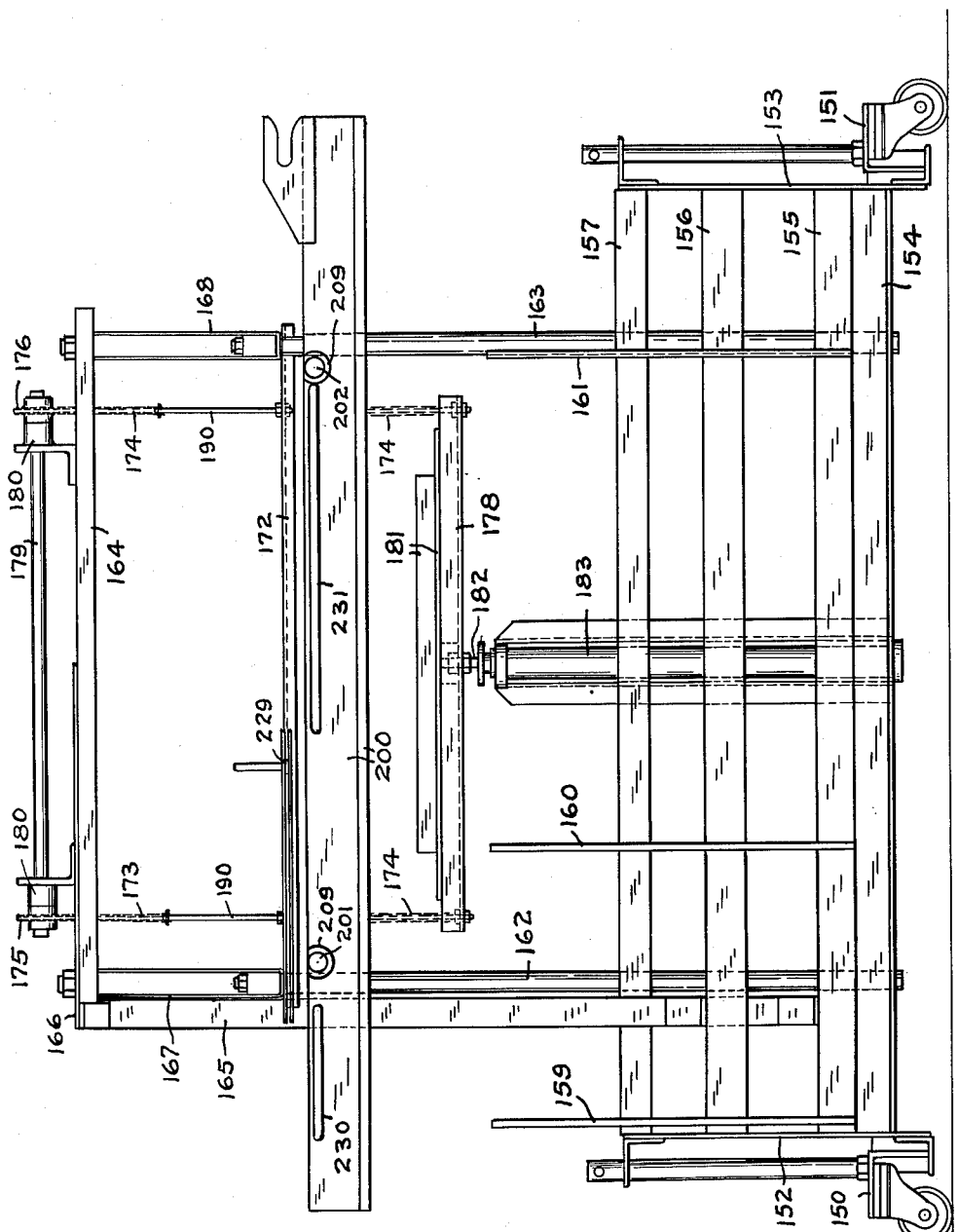
FIG. 9 is a front elevation of the machine shown in FIG. 8.
Figure 10:
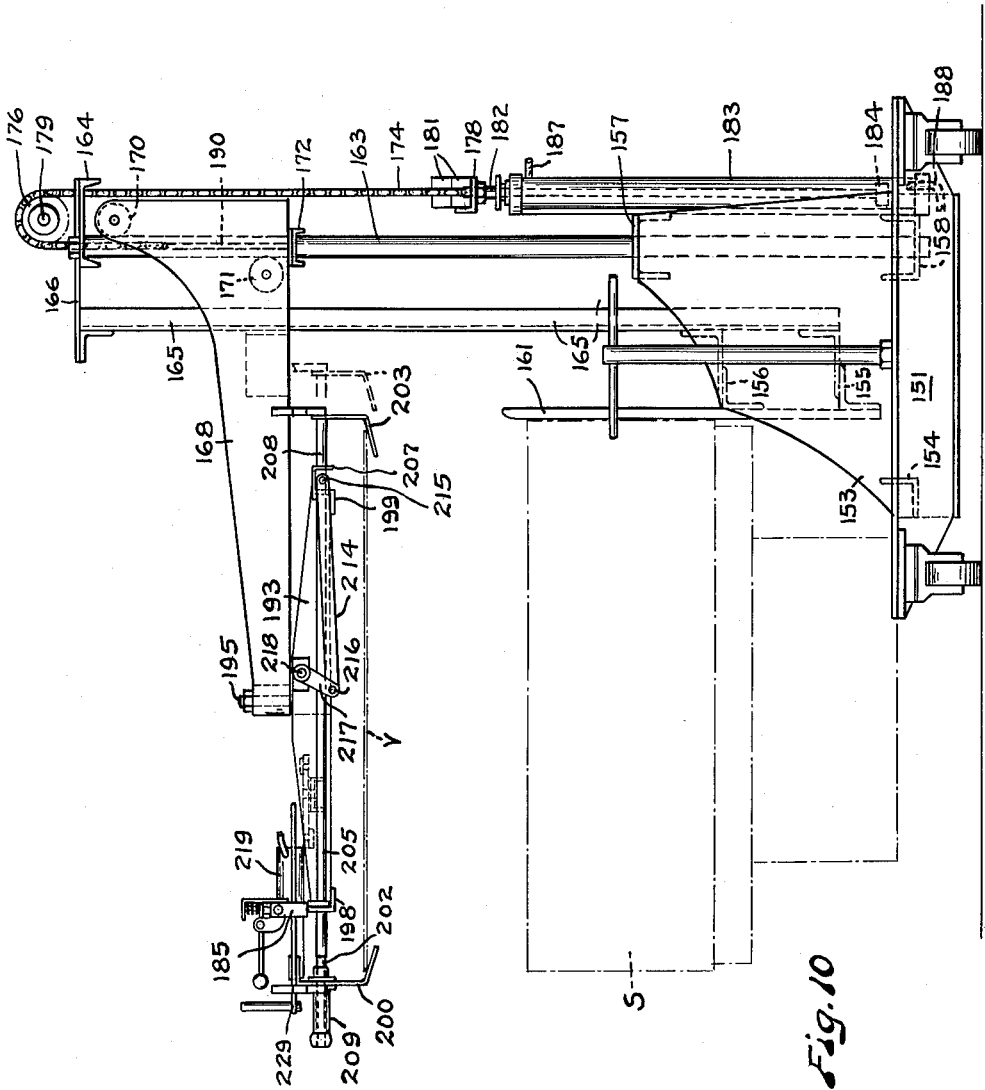
FIG. 10 is an end view of the machine shown in FIGS. 8 and 9.

The modified form of plywood lay-up machine shown in FIG. 8, 9 and 10 has a main frame comprising transverse end frame members 150 and 151, upright end plates 152 and 153 rigid with respective end frame members 150 and 151 and longitudinal frame members 154, 155, 156, 157 and 158 rigid with the said end plates and extending lengthwise of the machine. Preferably three upright stop and guide members 159, 160 and 161 against which the lay-up pile or stack S of plywood is positioned are secured to and supported from the longitudinal frame members 155 and 156. Two upright tubular spaced apart carriage supporting posts 162 and 163 of substantial height are secured to the longitudinal frame members 157 and 158 inwardly from the ends of said frame members and a frame bar 164 of inverted channel shape connects the top end portions of said two posts. Upright frame bar 165, shown at the left in FIGS. 8 and 9, and a diagonal plate 166, FIGS. 8 and 10, help to support and brace the upright tubular carriage supporting posts 162 and 163, the diagonal plate 166 being connected between the upper end of frame bar 165 and the inverted channel shaped plate 164.

Two carriage supporting brackets 167 and 168 are supported for vertical movement and for horizontal swinging movement on the respective posts 162 and 163. Each carriage bracket 167 and 168 is provided with an upper roller 170 and a lower roller 171 which run on opposite sides of the adjacent post 162 or 163 and cooperate to support the bracket for horizontal swinging movement and to provide roller bearings for the up and down movement of the bracket. A channel bar 172 is vertically movable on the posts 162 and 163 and extends longitudinally of the machine and the two carriage supporting brackets rest on this channel bar 172 and their vertical movement is controlled by movement of said channel bar 172. The means for vertically moving the channel bar 172 comprises two link belts 173 and 174 connected by rods 190 with said channel bar and extending upwardly over two sprocket wheels 175 and 176 and thence downwardly to a crosshead member 178. The sprocket wheels are keyed to a shaft 179 so that equal up and down movement of both end portions of the channel bar 172 and crosshead member 178 are insured. The shaft 179 is rotatively mounted in bearings 180 which are supported on the channel member 164. The link belts 173 and 174 operate through holes 191 in said channel member 164. The crosshead member 178 has counterweights 181 thereon and the medial portion of said crosshead member 178 is connected with a piston rod 182 which extends into a preferably pneumatic fluid pressure cylinder 183 and is connected with a piston 184 therein. A manually operated valve 185, FIG. 8, positioned near the front of the machine is operated by a lay-up man standing in front of the machine to selectively admit air under pressure from an air pressure supply conduit 186 either through a conduit 187 to the upper end of the cylinder 183 or through a conduit 188 to the lower end of the said cylinder, the valve 185 also providing for the exhaust of air from the end of the cylinder opposite to the one to which air under pressure is being admitted. Thus movement up and down can be imparted to the carriage supporting arms 167 and 168 by the valve 185 and the speed of this movement in both directions controlled by said valve.

The veneer carriage shown in FIGS. 8, 9 and 10 comprises two transverse end members 192 and 193 which are respectively pivotally connected by pivots 194 and 195 with the respective carriage supporting arms 167 and 168.

A longitudinally extending front bar 198 is rigidly attached to the front ends of the transverse members 192 and 193 and a longitudinally extending rear bar 199 is rigidly attached to the rear ends of said end members 192 and 193. Thus the parts 192, 193, 198 and 199 cooperate to form a rigid rectangular carriage frame. A front veneer holding member 200 of angular or approximately L shaped cross section is slidably supported on two guide rods 201 and 202 and a multiple piece rear veneer holding member 203 also of angular cross section is movably supported by two other rods 204 and 205. The rods 204 and 205 are supported for longitudinal sliding movement by the bars 198 and 199. The rear veneer holding member 203 is of multiple piece construction to provide clearance spaces 206 which allow said member 203 to move away from the veneer sheet without contacting the guide members 159, 160 and 161 in dropping the veneer. A longitudinally extending angle bar 207 is rigidly secured to the ends of the rods 204 and 205 and a plurality of rods or bars 208 rigidly secure the several sections of the rear veneer holding members 203 to this angle bar 207.

In this structure as shown in FIGS. 8, 9 and 10 the two veneer holding members 200 and 203 do not pivot but can be moved straight outwardly away from each other to drop at sheet V of veneer. The two guide rods 201 and 202 are each rigidly attached to the carriage frame, as by securing them to the bars 198 and 199 and the front veneer holding member 200 preferably has rigid tubular guide members 209 which fit over the guide rods 201 and 202 and mount the veneer member 200 for sliding movement on the rods 201 and 202. The veneer holding members have inclined veneer holding lower flanges like the previously described flanges 53.

Independent devices for moving the front veneer holding member 200 and the rear veneer holding member 203 are disclosed. The devices for moving the rear veneer holding member 203 between a veneer holding position, in which it is shown by full lines in FIG. 10, and a veneer dropping position in which it is shown by dot and dash lines in FIG. 10, comprise a fluid pressure cylinder 210, see FIG. 8, secured by a bracket 211 to the end member 192 of the carriage and having a piston 212 connected by a piston rod 213 with the angle bar 207. Equal or parallel movement of the two end portions of the bar 207 and rear veneer holding member 203 connected therewith is assured by two links 214, FIG. 8, positioned near the respective end bars 192 and 193 and each having one end portion connected by a pivot 215, FIG. 10, with the bar 207 and the other end portion connected by a pivot 216 with a lever arm 217. The two lever arms 217 near opposite ends of the carriage are fixedly secured to a common shaft 218 which extends longitudinally of the carriage and is rotatively supported by the end bars 192 and 193.

The admission to and exhaust from the cylinder 210, of fluid under pressure is controlled by a manually operated valve 219 which is positioned for convenient operation by a person working near the end of the machine shown at the left in FIG. 8. The air pressure supply pipe 186 is connected with the valve 219 and said valve 219 is connected by conduits 220 and 221 with the respective ends of the cylinder 210. All of the conduits 186, 187, 188, 220 and 221, are shown by straight lines in FIG. 8 but it will be understood that these conduits are flexible. Outward movement of the veneer holding member 203 from a veneer holding position toward a veneer dropping poistion will tend to move a sheet of veneer V held thereby against the upright veneer guide members 159, 160 and 161 and this will usually drop a sheet of veneer or core stock V in a correct position on the lay-up stack S even though the front veneer holding member 200 is not moved outwardly. However, devices by which this front veneer holding member 200 can be manually moved outwardly are preferably provided. These devices, FIG. 8, comprise a longitudinally extending supporting bar 223 fixed to the carriage, for instance by securing it to the rods 201 and 202. Two bell crank levers 224 and 225 are mounted by pivots 232 on said bar 223. Two parallel links 226 and 227 connect arms of the respective bell crank levers 224 and 225 with the front veneer supporting member 200. The other arms of the two bell crank levers 224 and 225 are connected with each other by a longitudinally extending link 228 which synchronizes the movement of the two bell crank levers and insures equal movement of the two end portions of the front veneer holding member 200. A hand lever 229 is secured to one of the bell crank levers to facilitate manual movement of the front veneer holding member. An operator standing in front of the carriage can grasp the lever and move the front veneer holding member 200 outwardly if a sheet V fails to drop properly.

Preferably two bale shaped carriage swing grips 230 and 231 are secured to the front portion of the veneer holding member 200 so that an operator working near either end of the carriage can horizontally move or swing said carriage between a "lowering" position directly above a lay-up stack S and a "loading" position in which it is transversely and longitudinally offset relative to the stack S and is properly aligned to receive a sheet of veneer being discharged from glue applicator rolls. The dot and dash lines 233 in FIG. 8 illustrate the swing of the carriage supporting arms 167 and 168 in moving the carriage so that the pivots 194 and 195 occupy the positions in which they are shown by dotted lines.

A bumper 234 limits swinging movement of the veneer carriage in the loading direction and the frame post 165 can limit swinging movement of the same in the opposite direction.

The operation of the plywood lay-up machine shown in FIGS. 8, 9 and 10 is similar to the operation of the machine shown in FIGS. 1 to 7 inclusive except that the cycle of carriage operation of the device of FIGS. 1 to 7 is automatic after it has been started, while with the device of FIGS. 8, 9 and 10 each movement of the carriage is controlled by one of the operators or lay-up men, either by operation of the valve 185 to raise and lower the carriage, or by operation of the valve 219 to drop the sheet of veneer, or by one or both operators grasping the handholds 230, 231 and manually swinging the carriage, or by an operator using the lever 229 to move the front veneer holding member outwardly. Also in the device shown in FIGS. 8, 9 and 10 the veneer holding members move outwardly to drop the veneer but do not pivot.

Obviously changes in this device may be made within the scope of the following claims.

I claim:

1. In a plywood lay-up machine, a main frame; a relatively long carriage of generally rectangular shape having two parallel sides; vertically movable carriage supporting arms swingingly supporting said carriage from said main frame for horizontal movement of the carriage toward and away from the main frame; a veneer sheet supporting member carried by each side of said carriage and having an inwardly directed shelf like portion spaced below the carriage and extending substantially continuously throughout the length of the carriage providing room for end loading veneer sheets onto the flanges between the carriage and the flanges with the edges of the veneer sheets supported by the flanges while the veneer sheets are being loaded, said flanges inwardly considered, being inclined downwardly relative to the plane of the carriage, whereby only the lower corner of the longitudinal edge portion of a veneer sheet will contact the flange on which it rests with minimum interference with glue on the sheet; and control means connected with said veneer sheet supporting members capable of moving said members toward and away from each other.

2. In a plywood lay-up machine, a main frame; a relatively long rectangular veneer carriage having two end bars and having two side bars supported for oscillation by said end bars; a carriage supporting frame mounted for vertical movement on said main frame; power actuated lift and lowering devices connected with said carriage supporting frame; two parallel carriage supporting arms swingingly supported by said carriage supporting frame for vertical movement therewith and pivotally connected with the end bars of said veneer carriage supporting said veneer carriage for parallel horizontal swinging movement between a veneer loading position and a veneer dropping position which is offset longitudinally and transversely from the veneer loading position; arm moving means capable of swingingly moving said arms; a relatively long veneer holding member of L-shaped cross section attached to each side bar and extending downwardly therefrom and having an inwardly directed veneer supporting flange extending continuously substantially throughout the entire length of the carriage and spaced below the carriage providing room between the carriage and said flanges for end loading thin flexible glue coated sheets of veneer onto the flanges with the edge portions of the sheets sliding on the flanges during the loading operation and supported throughout their entire length by said flanges when they are fully loaded onto the flanges; control means connected with the side bars of said veneer carriage adapted to oscillate said side bars in moving said veneer holding members between a veneer holding and a veneer dropping position; a trip arm carried by the side of the carriage adjacent the main frame and extending below the carriage and positioned to engage with and be moved by material below the carriage as the carriage nears a veneer dropping position; and devices actuated by movement of said trip arm controlling the means by which said carriage side bars are oscillated and controlling the power actuated lift and lowering devices for said carriage supporting frame.

References Cited in the file of this patent
UNITED STATES PATENTS

| | | |
|---|---|---|
| 1,035,265 | Taylor | Aug. 13, 1912 |
| 1,489,892 | Loughridge | Apr. 8, 1924 |
| 1,727,209 | Lentz | Sept. 3, 1929 |
| 2,008,200 | Clauss | July 16, 1935 |
| 2,119,725 | Stecher | June 7, 1938 |
| 2,333,479 | Graf | Nov. 2, 1943 |
| 2,562,247 | Van Schie | July 31, 1951 |
| 2,598,222 | Cahners | May 27, 1952 |
| 2,680,524 | Snyder | June 8, 1954 |
| 2,699,879 | Bertram | Jan. 18, 1955 |